United States Patent [19]

Barron et al.

[11] Patent Number: 5,075,122
[45] Date of Patent: Dec. 24, 1991

[54] METHOD OF EXTRACTING LIQUID FROM CITRUS FRUITS

[76] Inventors: Daniel R. Barron, 826 N. Richman Ave., Fullerton, Calif. 92632; Robert I. Wald, 105 Malibu Coloney Dr., Malibu, Calif. 90265

[21] Appl. No.: 597,447

[22] Filed: Oct. 12, 1990

[51] Int. Cl.$^5$ .......................... A23L 2/00; A23N 1/00
[52] U.S. Cl. ........................................ 426/489; 99/509
[58] Field of Search ............................ 426/489; 99/509; 100/50, 107, 116

[56] References Cited

U.S. PATENT DOCUMENTS

| | | | |
|---|---|---|---|
| 1,898,588 | 2/1933 | Metzger | 99/509 |
| 1,922,773 | 8/1933 | Maull | 100/49 |
| 1,960,501 | 5/1934 | Maull | 100/41 |
| 2,346,561 | 4/1944 | Delay | 100/50 |
| 2,414,053 | 1/1947 | McCarthy | 100/50 |
| 2,420,680 | 5/1947 | Pipkin | 100/50 |
| 2,882,815 | 4/1959 | Bernier | 100/52 |
| 3,675,570 | 7/1972 | Mersfelder | 100/90 |
| 3,736,865 | 6/1973 | Hait | 100/98 R |
| 4,024,810 | 5/1977 | Braun | 100/116 |
| 4,106,404 | 8/1978 | Schmid | 100/117 |
| 4,350,089 | 9/1982 | Braun | 100/116 |
| 4,376,409 | 3/1983 | Belk | 99/509 |
| 4,438,690 | 3/1984 | von Allworden | 100/116 |
| 4,516,490 | 5/1985 | Hartmann | 100/107 |
| 4,700,620 | 10/1987 | Cross | 99/510 |

*Primary Examiner*—George Yeung
*Attorney, Agent, or Firm*—Gerald M. Newman

[57] ABSTRACT

A juice extractor comprises a split containment that houses a distendable elastomer for embracing the outer surface of a fruit. An extracting mechanism, including a perforated sleeve, is inserted through the skin of the fruit and an inner inflatable bladder is expanded within the body of the fruit to express liquid therefrom.

5 Claims, 5 Drawing Sheets

METHOD OF EXTRACTING LIQUID FROM CITRUS FRUITS

BACKGROUND OF THE INVENTION AND PRIOR ART

This invention relates generally to extraction means for rapidly and economically separating liquids from mixtures of liquids and solids and particularly to a technique for extracting the juice from citrus fruit.

The problem of extracting the juice from citrus fruit and the like has been addressed by the prior art in many different ways. One solution comprises a manual extractor that physically compresses the fruit by squashing it between mechanically operated, appropriately shaped plates. Another technique simultaneously squeezes the fruit and subjects it to a vacuum for removal of the juice through a suitable screen. The prior art also discloses the use of a pair of flexible diaphrams that are forced together under fluid pressure to compress the fruit. While all of these techniques function to extract (or express) the juice from the fruit, they result in low yields and the bitter oils in the rind (skin) of the fruit being withdrawn along with the seeds and excessive pulp. Juice extracted from these devices require further refinement to enhance flavor, content and appearance.

OBJECTS OF THE INVENTION

A principal object of the invention is to provide a novel method of extracting liquids from mixtures of solids and liquids.

Another object of the invention is to provide a novel method of extracting juice from citrus fruit and the like.

A further object of the invention is to provide a method of gently and efficiently extracting juice from a delicate object such as a citrus fruit.

A still further object of the invention is to extract citrus juice in a manner which leaves the fruit substantially intact without tearing or breaking the rind except for a small entry hole.

SUMMARY OF THE INVENTION

In accordance with the preferred embodiment of the invention, a citrus fruit is surrounded by a containment such as a pressurized environment. Extraction means, containing an expandable bladder, are inserted therein for compressing the juice vesicles of the fruit. As the bladder expands and the juice is extracted, the extractor is removed to effect complete extraction of the juice without damage to the rind.

BRIEF DESCRIPTION OF THE DRAWINGS

These and other objects and advantages of the invention will be apparent from reading the following description in conjunction with the drawings, in which.

DESCRIPTION OF THE PREFERRED EMBODIMENT

Figure 1:
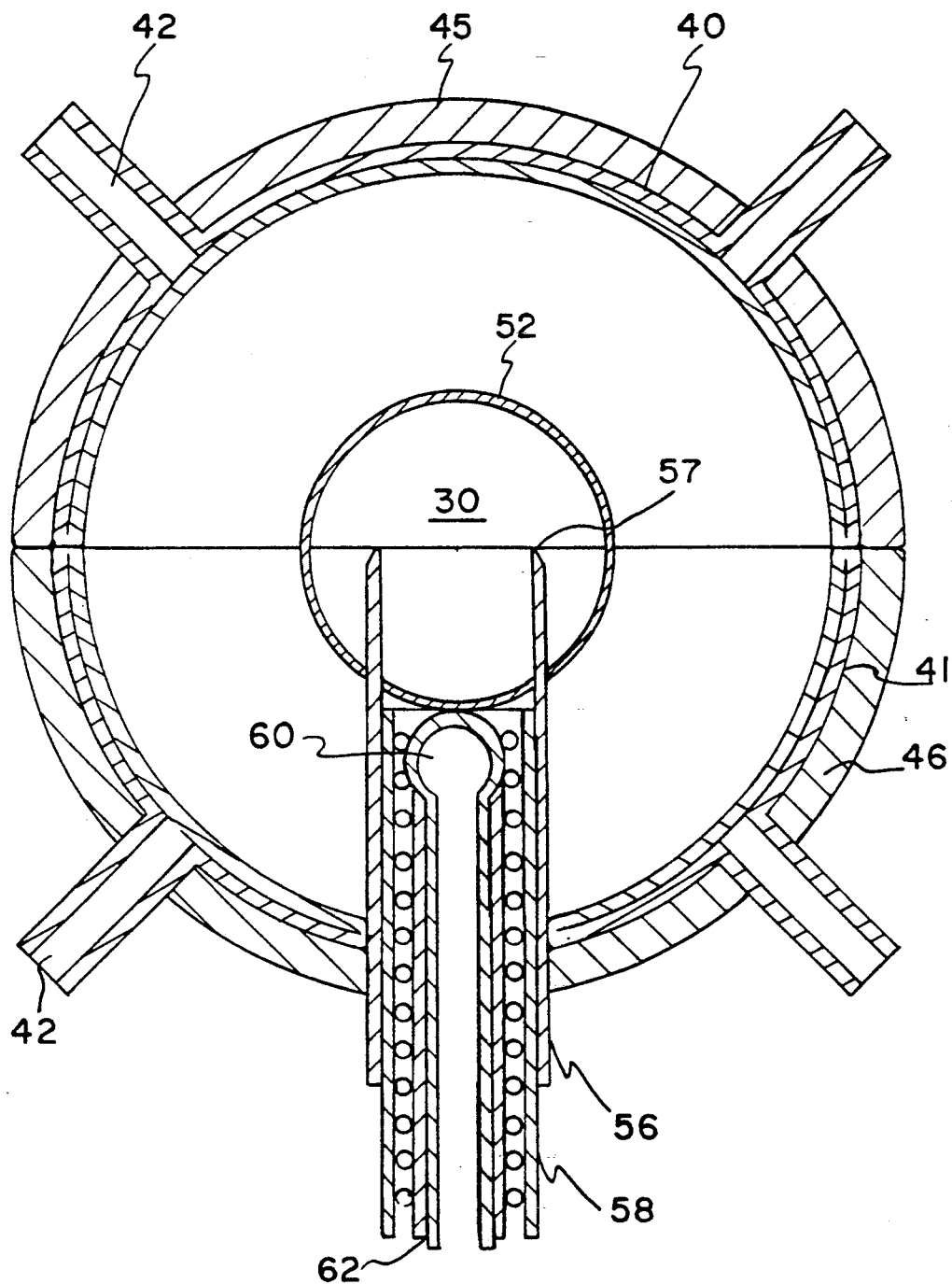
FIG. 1 is a cross section of a containment chamber and extracting apparatus illustrating juice extraction in accordance with the invention.

Referring to FIGS. and 2, an extraction mechanism is illustrated in an extraction chamber. The chamber comprises generally similarly shaped hemispheres 45 and 46 which are arranged to be moved apart and clamped together when desired by suitable means (not shown). The chambers are completely surrounded (internally) by a pair of distendable elastomeric members 40 and 41. The extraction mechanism 30 comprises a cylindrical knife 56 having a sharpened edge 57, a cylindrical strainer 58, a bladder tube 62 and an inflatable bladder 60. Extraction mechanism 30 also includes a tube 71 (shown in FIG. 2) through which pressurized air or fluid may be applied to inflate bladder 60. Strainer 58 permits the compressed liquid to be expressed out of the fruit and limits the amount of pulp withdrawn from the liquid.

A pair of tubes 42 extend from the respective hemispheres 45 and 46 and are part of the distendable elastomeric members 40 and 41. A pressurized medium, such as air or other fluids supplied to tubes 42 causes the elastomeric members 40 and 41 to distend and completely embrace and securely support the outer surface of a fruit. The distendable nature of the elastomeric members 40 and 41 enables them to accommodate to different sizes and types of fruit and to conform to irregularities in the surface thereof. This is important since proper support of the skin prevents abrasion and release of bitter oils during the extraction process.

Figure 2:
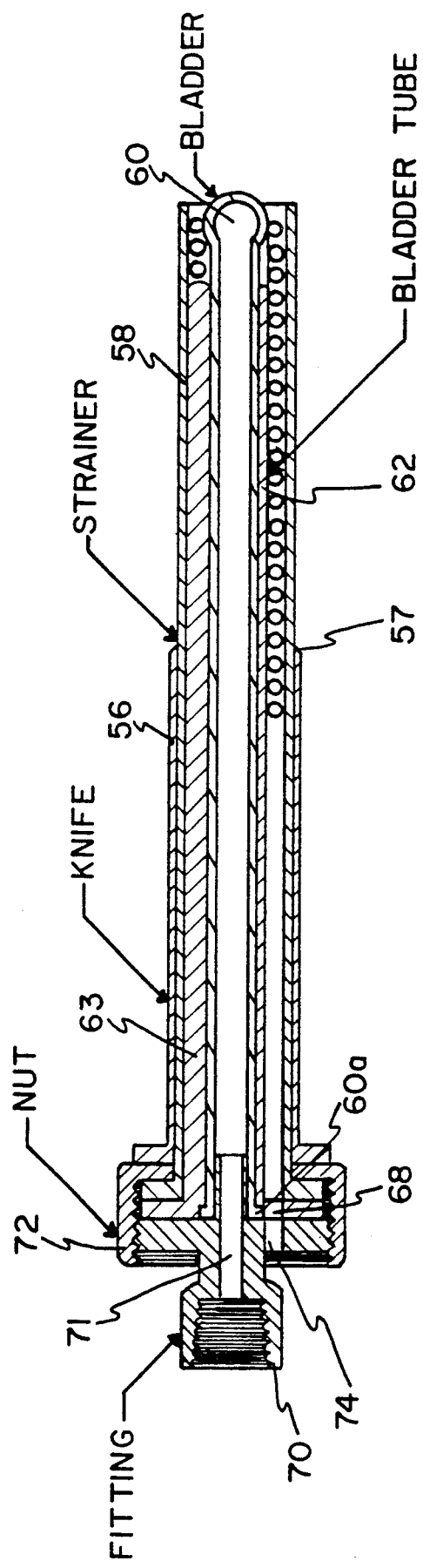
FIG. 2 is an exploded cross sectional view of the extraction mechanism of FIG. 1.

As previously described, inflatable bladder 60 is subjected to compressed air or other fluid pressure by means of port 71 (FIG. 2). As the pressure is increased, the inflatable bladder 60 expands and in concert with the elastomeric members 40 and 41, gently but firmly compresses the juice vesicles of the fruit to extract or express the fluid therefrom. The liquid is expressed through the apertures in strainer 58 which holds back the pulp and seeds not compressed against the rind. The liquid is removed through extractor 30 between strainer 58 and bladder tube 62. When the extraction process is complete, the bladders deflate and extraction mechanism 30 is removed.

With particular reference to FIG. 2, the cylindrical cutter or knife 56 is mounted so as to slide on perforated cylinder (strainer) 58 and operated by means (not shown) during the extraction of the juice from the fruit. Bladder tube 62 is supported by three longitudinal ribs 63 within cylindrical strainer 58. Ribs 63 are sufficient to position the bladder tube within strainer 58 and to permit juice to flow out of the fruit and out of the extraction mechanism. Bladder 60 includes a flange 60a at its base that is compressed between the bladder tube 62 and fitting 70 and captivated by a coupling nut 72. Fitting 70 has a generally "T" shaped cross section. Port 71 permits the passage of air or other fluid under pressure for inflating bladder 60. Fitting 70 also includes a plurality of apertures 74 for permitting the extracted liquid or juice to pass out of the extraction mechanism. The bladder tube 62, having apertures 68 that generally align with apertures 74 in fitting 70, is situated between the respective shoulders on bladder tube 62 and perforated tube 58. The entire arrangement is coupled together securely by coupling nut 72 which engages a threaded portion on the base of fitting 70. Fitting 70, having internal threads serves to couple the extraction mechanism to the fluid source (not shown).

Figure 3:
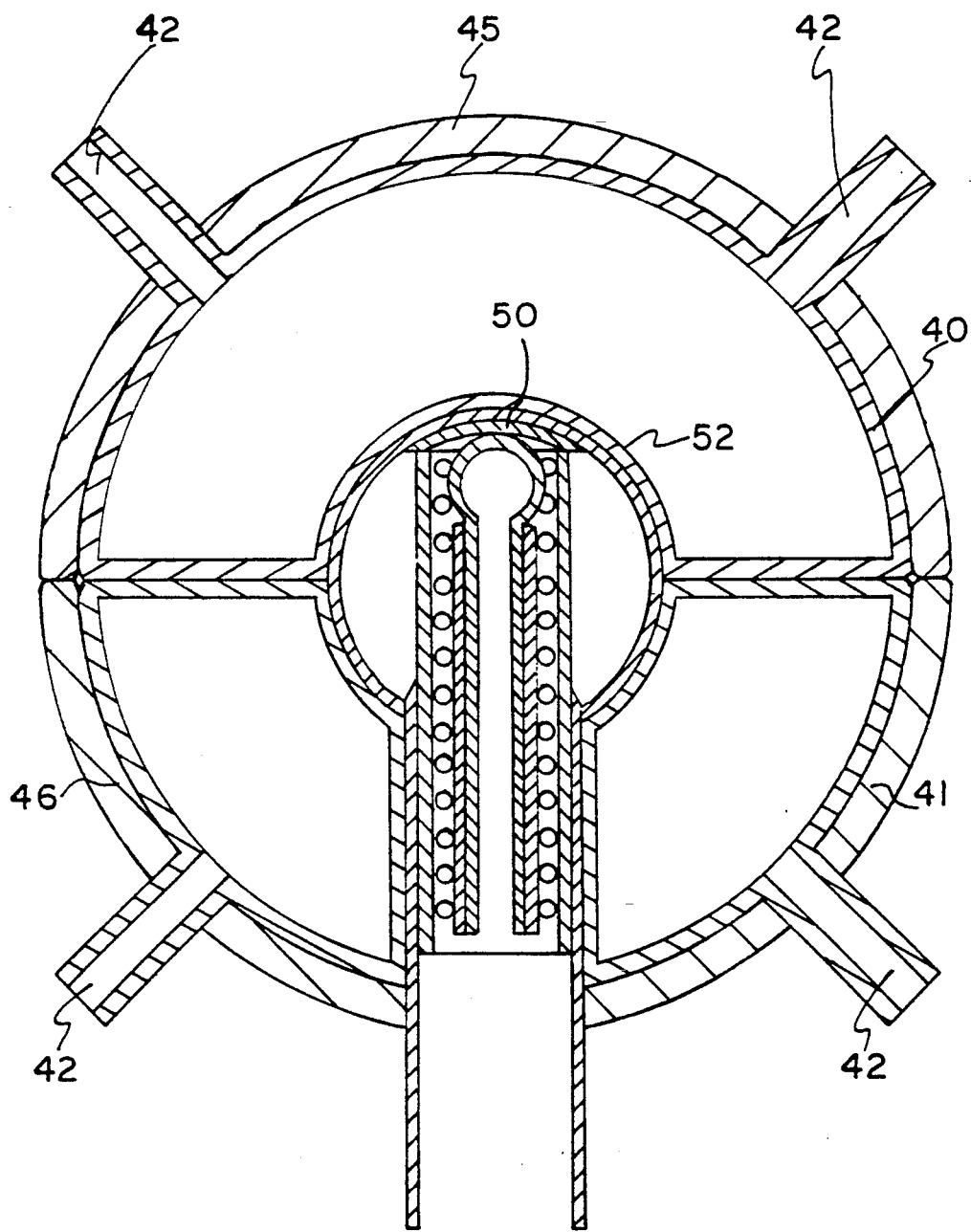
FIG. 3 illustrates the extraction mechanism of FIG. 2 prior to inflation of the bladder within the fruit and the outer bladder fully inflated.
Figure 4:
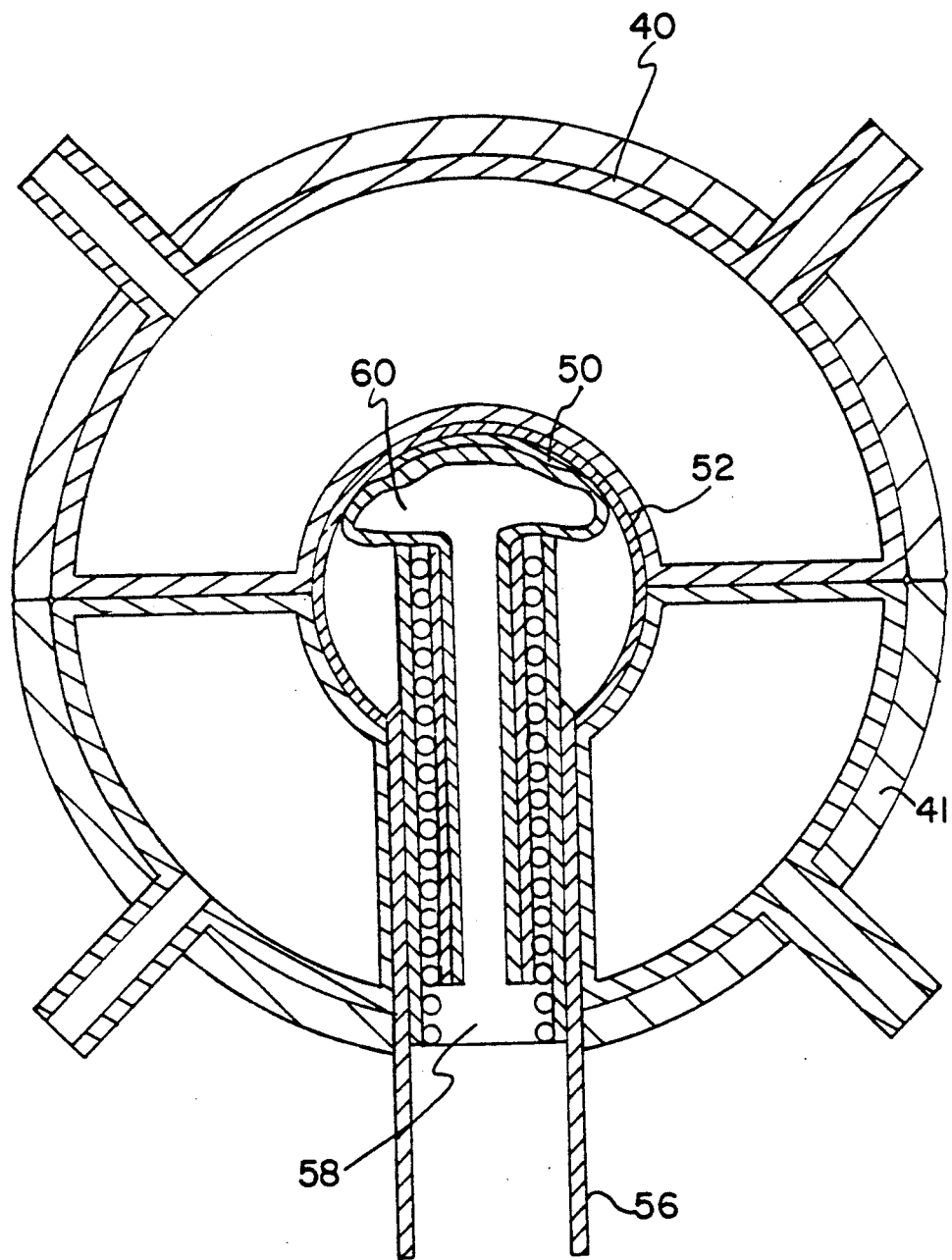
FIG. 4 illustrates commencement of extraction by inflation of the bladder.
Figure 5:
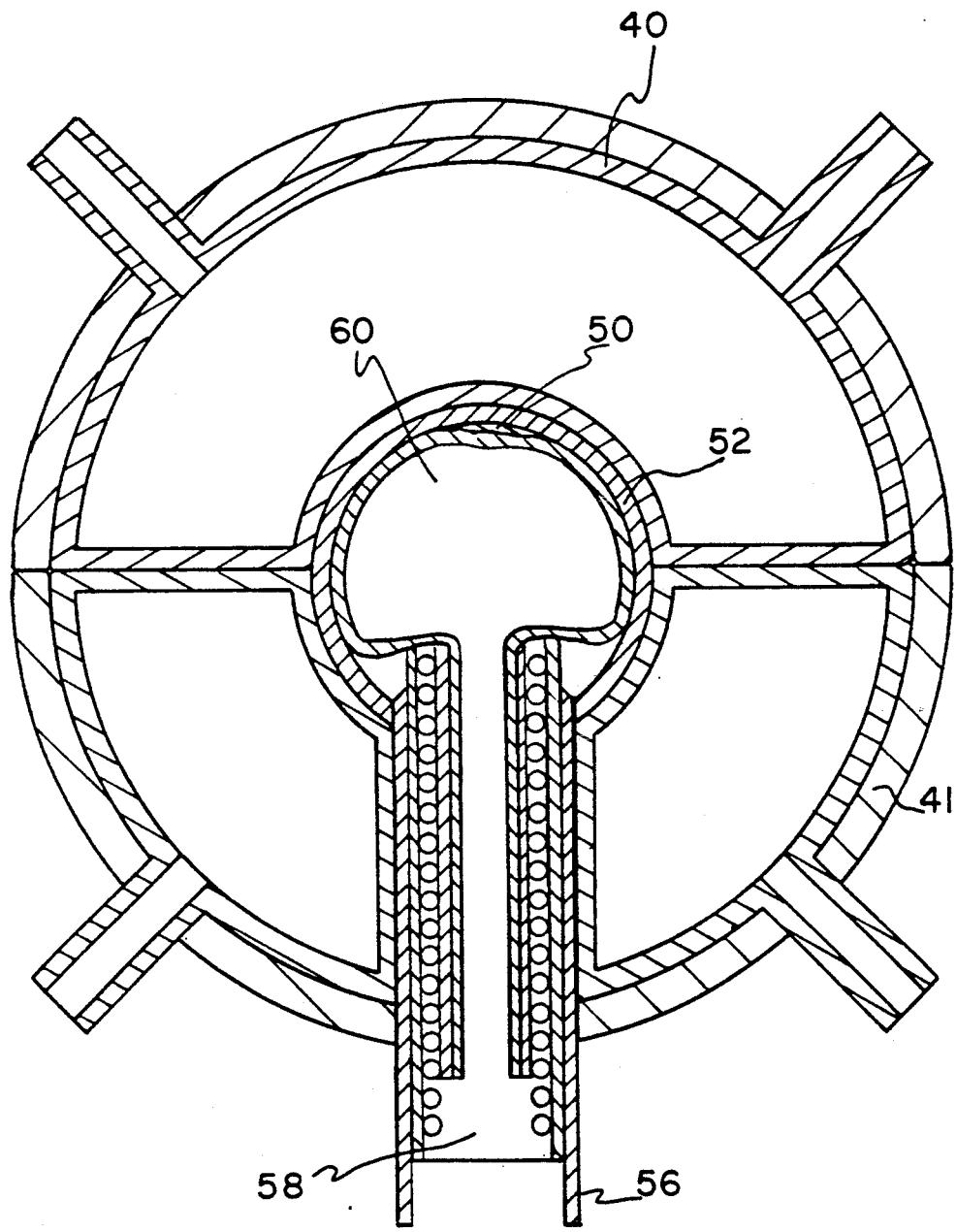
FIG. 5 shows the bladder near full expansion with the juice being substantially fully extracted.

The illustrations of FIGS. 3-5 are schematic and it should be understood that fruit 52 is completely supported about its exterior surface by the distendable elastomeric member 40 and 41 as described previously. It will also be appreciated that because of the different sizes of fruit 52, the technique of providing a chamber with distendable elastomeric members for contacting the surface of the fruit is very desirable. With particular reference to FIG. 4, cutter 56 is moved out from the fruit to expose strainer 58. Bladder 60 is shown in its beginning stage of expansion with the pressurized juice within fruit 52 exiting through the strainer. In FIG. 5, the expansion of bladder 60 is almost complete, and in this cross sectional view, the cut away portion 50 of the fruit is shown captivated between the bladder 60 and the inner surface of the fruit 52. When the juice is fully extracted the pressurized fluid is removed and bladder 60 contacts back into bladder tube 62.

It will be appreciated that numerous techniques for opening and closing the hemispheres and for positioning the extraction mechanism in the fruit will occur to those skilled in the art without departing from the spirit and scope of the invention. The invention is to be limited only as defined in the claims.

What is claimed is:

1. A method of extracting liquid from a citrus fruit comprising the steps of:
    supporting the outer surface of said fruit;
    inserting an extractor including an inflatable bladder into said fruit;
    inflating said bladder to expand said bladder against the supported outer surface of said fruit; and
    extracting said liquid from said fruit.

2. The method of claim 1 further including the step of removing said extractor during expansion of said bladder.

3. The method of claim 2 further comprising the step of supporting the outer surface of said fruit with a pressure distendable bladder.

4. The method of claim 3 wherein said extractor comprises tube means having cutting means and extraction means at one end and carrying said bladder.

5. The method of claim 4 wherein said extraction means comprises a perforated tube and said cutting means comprises a hollow tube that is concentric with and movable relative to said perforated tube.

* * * * *